April 28, 1959   F. KAESS ET AL   2,884,307
MANUFACTURE OF WHITE CALCIUM CYANAMID
Filed Sept. 12, 1957
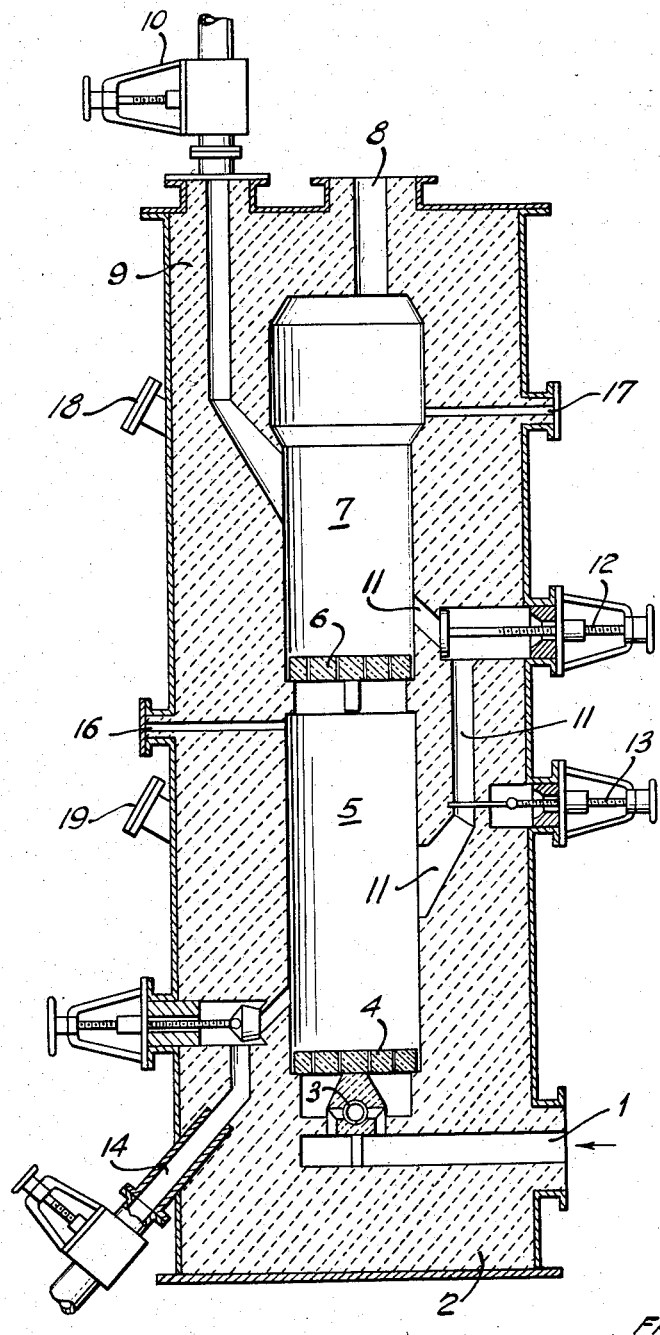
INVENTORS:
FRANZ KAESS
HERMANN KRONACHER
BY ERICH HEINZ BECKER-BOOST
AGENT United States Patent Office
2,884,307
Patented Apr. 28, 1959

2,884,307

MANUFACTURE OF WHITE CALCIUM CYANAMID

Franz Kaess and Hermann Kronacher, Trostberg, and Erich H. Becker-Boost, Bochum, Germany, assignors to Süddeutsche Kalkstickstoff-Werke A.G., Trostberg, Germany Application September 12, 1957, Serial No. 683,585

Claims priority, application Germany May 4, 1954

4 Claims. (Cl. 23—78)

The invention relates to improvements in the manufacture of white calcium cyanamide in turbulence reactors, and this application is a continuation-in-part of our application Serial No. 505,778, filed May 3, 1955, now abandoned.

A well-known serious drawback of such turbulence reactions is the difficulty to combine the optimum conditions for the turbulent motion of the reactants with the optimum conditions for obtaining good yields.

So-called white calcium cyanamid is prepared by reacting hydrogen cyanide or preferably mixtures of carbon monoxide and ammonia at temperatures of about 600°–900° C. with finely divided calcium carbonate or oxide. Though the turbulence method appears to be very attractive for carrying out this reaction, it has not yet been possible to obtain yields satisfactory for large scale commercial production.

It is a principal object of the invention to provide an economic method for the manufacture of white calcium cyanamid by the turbulence process in good yields.

Other objects and advantages will be apparent from a consideration of the specification and claims.

According to the invention, white calcium cyanamid of high nitrogen content is prepared by passing the reacting gases in countercurrent to the solid material through at least two superposed turbulent reaction zones, whereby fresh lime is charged into the upper zone and retained therein until it has taken up about 10 to 15 percent of N; said partly nitrogenated material is then passed into the succeeding lower zone in which the nitrogenation is completed.

In this way, it is possible to obtain products of 30% N with a conversion of the reaction gases substantially to the theoretic limit. An increase of the number of the reaction zones to three is required only when products of more than 33% N, corresponding to about 94% $CaCN_2$, are desired.

A further increase of the N content is generally impossible when technical limestone or lime are used as starting materials; therefore, a three-stage unit will be the largest required technical unit, provided that the condition is satisfied that the transfer from the first stage to the next stage is carried out with a first stage product of 10 to 15% N.

We have found that, as soon as said first stage product has reached said N content, the rate of reaction decreases; unconverted reaction gases leave the reaction zone, and the yield calculated on the gaseous components, particularly the expensive ammonia, drops quickly. If, however, from this time on, the gases after passage over such 10 to 15% N product are brought, after transfer of the charge, in contact with fresh lime, said gases react again with such lime.

If the charge transfer is carried out with a first stage charge of more than 15% N, the gases leaving the second stage are not exhausted and the yields decrease. If the charge transfer is made with a first stage product of less than 10% N, it is impossible to obtain a 30% N end product in two-stage reactors.

If attempts are made to operate the process in continuous countercurrent, it is not possible to obtain white 30% N calcium cyanamide, even though four plates are used. In addition, the yields are low. The reason is that the individual grains of the solid stay for different lengths of time in the reaction zones and, therefore, take up different amounts of nitrogen.

It was further found that the decrease of the reaction rate as a function of the N content is substantially the same for all grain sizes and types suitable for forming turbulence layers; therefore, the moment at which the charge has to be transferred from the first into the second turbulence zone, is for any material the same, at an N content of 10 to 15%.

An apparatus suitable for carrying out the process of the invention comprises a multiple bed turbulent reactor consisting of at least two superposed compartments; the bottom compartment is equipped with means for feeding the gas and discharging the reaction product, the top compartment is provided with the feed for the lime; all compartments are connected by channels by-passing the bottom plates supporting the solid material, which channels are provided with adjustable control means.

The invention will be more fully understood in connection with the accompanying drawing, which shows diagrammatically a vertical section of a two-bed turbulent flow reactor suitable for carrying out the process.

Carbon monoxide gas coming from a heat exchanger enters the reactor 2 through the supply pipe 1, and ammonia is fed through pipe 3. From pipe 3, the ammonia passes through nozzles into the carbon monoxide current and is admixed thereto. The obtained mixture passes through the slotted or perforated bottom 4 into the compartment or chamber 5, whereby the gas mixing zone below said bottom is as short as possible. The gas current imparts to the solid material introduced into the compartment 5 a turbulent motion above the bottom plate 4, and passes then through the slotted or perforated bottom 6 into the top turbulence compartment or chamber 7. The compartment 7 is considerably enlarged at its upper end before the gas outlet pipe 8 in order to lessen, as far as possible, the solids carryout and entraining of dust by lowering the gas velocity and to allow return of the entrained solids to the turbulent bed.

Lime of suitable grain size is fed through a gate 10 and channel 9 into the turbulence chamber 7. A connecting channel 11 serves as overflow for the material from the chamber 7 into the chamber 5. Said channel 11 is equipped with two control valves 12 and 13; similar valves are provided in the feed channel 9 and in the discharge channel 14.

After the lime has been nitrogenated in the chamber 7 to a content of 10–15% N, it is periodically transferred through the channel 11 into the chamber 5. For this purpose, first the valve 12 is opened while valve 13 remains closed; in this way, the channel is filled with the material down to the valve 13. When now the valve 13 is opened, the resistance of the down flowing solids in channel 11 prevents the gases to pass through said channel and to by-pass the solids bed on the bottom plate 6 of the turbulent chamber 7. If the bed has been discharged to the level of the overflow, the upper valve 12 is closed, and subsequently also the valve 13 after the channel 11 has been emptied, so that no gas transfer can take place through said channel.

When the nitrogenation of the lime has been completed in the turbulent chamber 5, the reaction product is discharged periodically through the channel 14 in the manner described above with respect to channel 11. Also, this channel is equipped with two control valves. The apertures 16 and 17 in the reactor serve for inserting thermo-couples, and the windows 18 and 19 allow observation of the process in the turbulence chambers 5 and 7.

The bottoms of the reactor compartments are made of conventional alumina-containing refractory filter plates. The ammonia-carbon monoxide mixture entering the reactor is, during its passage through the bottom of the lower compartment, partially converted to hydrocyanic acid, which conversion increases the yield of cyanamide by displacing the reaction equilibrium. In this way, it is possible to combine the reactions of lime with ammonia-carbon monoxide, and of lime with hydrocyanic acid for converting the lime to calcium cyanamide in a single step, instead of first completing the difficult conversion of carbon monoxide or methane with ammonia to hydrocyanic acid and then react the thus obtained hydrocyanic acid separately with lime. It was found that in spite of an initial presence of larger amounts of hydrocyanic acid the hydrocyanic acid content of the effluent gas is always substantially the same, so that there is no loss of hydrocyanic acid, and no unnecessary processing of the gas is required.

The color of the obtained product depends substantially only on the color of the employed lime, whereas in the methods used heretofore always dark products were obtained when higher concentrations of hydrocyanic acid were used.

A particular advantage of our novel process is that the ammonia and hydrocyanic acid of the effluent gas need not be separated but can be recycled and reused together. Otherwise, the effluent gas is worked up continuously in the same way as in the conventional hydrocyanic acid manufacture from carbon monoxide and ammonia.

The gases are heated to reaction temperature before they enter the reactor. The heating must be carried out carefully so as to avoid decompositon of the gases; preferably, they are heated in separate electrically heated ceramic heaters, in which heating coils are embedded in the ceramic walls, and in which the rate of flow is maintained high enough to remain below the rate of decomposition of the gases in contact with the ceramic material.

The following example is given to illustrate the invention but it is to be understood that it is in no way intended to limit the invention. All parts and percentage figures are by weight.

Example 1

The compartments of a two-bed turbulent reactor of the type shown in the drawing are filled each with 60 kg. of calcined finely granulated limestone (size 0.2 to 1.5 mm.) which are kept in turbulent motion by introducing 100 m.$^3$ of CO and 50 m.$^3$ of $NH_3$ per hour at a temperature of 750–800° C. The residence time of the gas, calculated on the empty space taken up by the lime charge in repose, is .5 sec. per bed.

After the reaction product of the upper compartment has obtained an N content of about 10–15 percent, 75 kg. of the product of the lower bed with an N content of about 30% are withdrawn without interruption of the gas current. The product contains still about 14 percent of free CaO but no free carbon. At the same time, a corresponding amount of partially nitrogenated product is transferred from the upper turbulent bed into the lower chamber and CaO is fed into the upper chamber, and this sequence is continually repeated.

In a single passage of the gases, about 50% of the ammonia were converted to calcium cyanamide, and the ammonia loss was less than about 5%.

After leaving the reactor, the heat of the gases is utilized in a recuperator. Ammonia and hydrocyanic acid are then separated, and the carbon dioxide is removed in a special washing step. The remaining carbon monoxide and hydrogen are subjected to a separation procedure. After addition of fresh gas quantities, the recovered ammonia and carbon monoxide are recycled into the process. The residual gases, for instance hydrogen, may be used for heating purposes or for the synthesis of ammonia.

The following examples illustrate the results obtained when the process is carried out under conditions outside the critical range set forth in Example 1.

Example 2

The same reactor was used as in Example 1 under the same conditions and at the same temperature with the only difference that the reaction product of the upper compartment was transferred into the lower compartment after it had obtained an N content of only 5%. It was maintained in said lower compartment until the fresh lime fed into the upper compartment had reached said 5% N content, and then withdrawn from the reactor.

The end product had an N content of about 20 percent. The ammonia conversion was, like in Example 1, about 50%.

Example 3

The operating conditions were similar to those in the preceding examples but the transfer of the charge from the upper to the lower compartment was effected only after the N content of the charge in the upper compartment was 20%.

The ammonia conversion was only about 40%, and an ammonia loss of 7 to 10% was observed.

Example 4

Only one compartment of the reactor was used with a charge of 120 kg. of calcined lime.

The gas throughput, temperatures and residence time of the lime in the reactor were the same as set forth in Example 1.

The end product had an N content of about 24 percent. About 40 percent of the ammonia had been converted to calcium.

The end product had an N content of about 24 percent. About 40 percent of the ammonia had been converted to calcium cyanamide, the $NH_3$ loss was 5 percent.

A comparison of Examples 2 to 4 with Example 1 shows that a high percent cyanamide in good yields is only obtained when the transfer of the charge from the upper to the lower compartment is carried out with a pre-nitrogenated lime of about 10–15 percent N.

We claim:

1. A process for the preparation of calcium cyanamide from lime and a hydrogen cyanide forming gas mixture of carbon monoxide and ammonia comprising providing at least two superposed turbulent reaction zones, passing said gas mixture upwardly through said reaction zones at a temperature of about 750 to 800° C., placing finely granulated lime in the uppermost reaction zone and maintaining the same therein in turbulent motion by the upwardly passing gas mixture until said lime contains about 10 to 15 percent of nitrogen in the form of calcium cyanamide, subsequently transferring said calcium cyanide containing material from said uppermost zone into the next lower zone separately from the up-streaming gas, and maintaining said material in said lower turbulent reaction zones until the nitrogenation is substantially completed.

2. The process claimed in claim 1, wherein the transfer of the solids from said second into said first zone is carried out periodically.

3. The process claimed in claim 1 wherein the transfer of the solids from said second into said first zone is carried out continuously.

4. A process as claimed in claim 1, comprising separately heating said carbon monoxide and ammonia to reaction temperature, mixing the heated gases, and passing the gas mixture into said first reaction zone through ceramic filter plates catalyzing the formation of hydrogen cyanide.

References Cited in the file of this patent

UNITED STATES PATENTS

| | | |
|---|---|---|
| 1,745,350 | Caro et al. | Feb. 4, 1930 |
| 1,745,753 | Frank et al. | Feb. 4, 1930 |
| 2,702,742 | Hillard | Feb. 22, 1955 |
| 2,715,548 | Fish | Aug. 16, 1955 |